United States Patent
Kuribayashi

(10) Patent No.: US 12,301,994 B2
(45) Date of Patent: May 13, 2025

(54) CONTROL DEVICE, IMAGING APPARATUS, CONTROL METHOD, AND CONTROL PROGRAM

(71) Applicant: FUJIFILM Corporation, Tokyo (JP)

(72) Inventor: Kosuke Kuribayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 238 days.

(21) Appl. No.: 18/060,890

(22) Filed: Dec. 1, 2022

(65) Prior Publication Data

US 2023/0209192 A1    Jun. 29, 2023

(30) Foreign Application Priority Data

Dec. 28, 2021  (JP) ................................. 2021-214702

(51) Int. Cl.
*H04N 23/68*    (2023.01)

(52) U.S. Cl.
CPC ....... *H04N 23/683* (2023.01); *H04N 23/6812* (2023.01)

(58) Field of Classification Search
None
See application file for complete search history.

(56) References Cited

U.S. PATENT DOCUMENTS

2010/0149368 A1*  6/2010  Yamashita ......... H04N 23/6815
                                                          348/222.1

FOREIGN PATENT DOCUMENTS

JP    2010-147635 A    7/2010
JP    2018-197772 A    12/2018

* cited by examiner

*Primary Examiner* — James M Hannett
(74) *Attorney, Agent, or Firm* — Studebaker Brackett PLLC

(57) ABSTRACT

A control device of an imaging apparatus including a first vibration detector and an imaging element, includes: a processor, and the processor is configured to: derive a first shake correction amount corresponding to a shake caused by a vibration and a second shake correction amount different from the first shake correction amount, based on first output data output from the first vibration detector; derive a first image shake amount related to a shake of an image based on image data obtained by imaging by the imaging element; and derive an offset component included in the first output data, based on the first shake correction amount, the second shake correction amount, and the first image shake amount.

19 Claims, 5 Drawing Sheets

CONTROL DEVICE, IMAGING APPARATUS, CONTROL METHOD, AND CONTROL PROGRAM

CROSS-REFERENCE TO RELATED APPLICATIONS

The present application claims priority under 35 U.S.C. § 119 to Japanese Patent Application No. 2021-214702, filed on Dec. 28, 2021. The above application is hereby expressly incorporated by reference, in its entirety, into the present application.

BACKGROUND OF THE INVENTION

1. Field of the Invention

The present invention relates to a control device, an imaging apparatus, a control method, and a computer readable medium storing a control program.

2. Description of the Related Art

JP2018-197772A discloses an image shake correction device including a storage unit that stores a first offset related to a shake detection unit, a calculation unit that calculates a second offset related to the shake detection unit based on a signal from the shake detection unit and the first offset, and a correction unit that corrects the signal from the shake detection unit using at least the first offset or the second offset in accordance with an elapsed time from a power ON of the image shake correction device and performs image shake correction based on the signal after correction.

JP2010-147635A discloses an imaging apparatus including an imaging element that captures a subject image through an optical system, an image signal processing unit that has a function of combining a plurality of captured images captured while moving the imaging apparatus into one captured image using a provided initial value, a posture sensor that obtains posture information of the imaging apparatus, and a control unit that processes information of the posture sensor and performs a cooperative control between a processing result and a processing result of the image signal processing unit, in which the image signal processing unit obtains a relative positional relationship between images based on image recognition processing, and the control unit obtains a positional relationship between images based on detection information of the posture sensor, specifies an absolute positional relationship of each image based on the obtained positional relationship and the relative positional relationship obtained by the image signal processing unit, and supplies the absolute positional relationship to the image signal processing unit as the initial value.

SUMMARY OF THE INVENTION

A control device according to one embodiment of the disclosed technology is a control device of an imaging apparatus including a first vibration detector and an imaging element, the control device comprising a processor, in which the processor is configured to derive a first shake correction amount corresponding to a shake caused by a vibration and a second shake correction amount different from the first shake correction amount based on first output data output from the first vibration detector, derive a first image shake amount related to a shake of an image based on image data obtained by imaging by the imaging element, and derive an offset component included in the first output data based on the first shake correction amount, the second shake correction amount, and the first image shake amount.

An imaging apparatus according to another embodiment of the disclosed technology comprises the control device.

A control method according to still another embodiment of the disclosed technology is a control method of an imaging apparatus including a first vibration detector and an imaging element, the control method comprising deriving a first shake correction amount corresponding to a shake caused by a vibration and a second shake correction amount different from the first shake correction amount based on first output data output from the first vibration detector, deriving a first image shake amount related to a shake of an image based on image data obtained by imaging by the imaging element, and deriving an offset component included in the first output data based on the first shake correction amount, the second shake correction amount, and the first image shake amount.

A control program stored in a computer readable medium according to still another embodiment of the disclosed technology is a control program of an imaging apparatus including a first vibration detector and an imaging element, the control program comprising deriving a first shake correction amount corresponding to a shake caused by a vibration and a second shake correction amount different from the first shake correction amount based on first output data output from the first vibration detector, deriving a first image shake amount related to a shake of an image based on image data obtained by imaging by the imaging element, and deriving an offset component included in the first output data based on the first shake correction amount, the second shake correction amount, and the first image shake amount.

DESCRIPTION OF THE PREFERRED EMBODIMENTS

Figure 1:
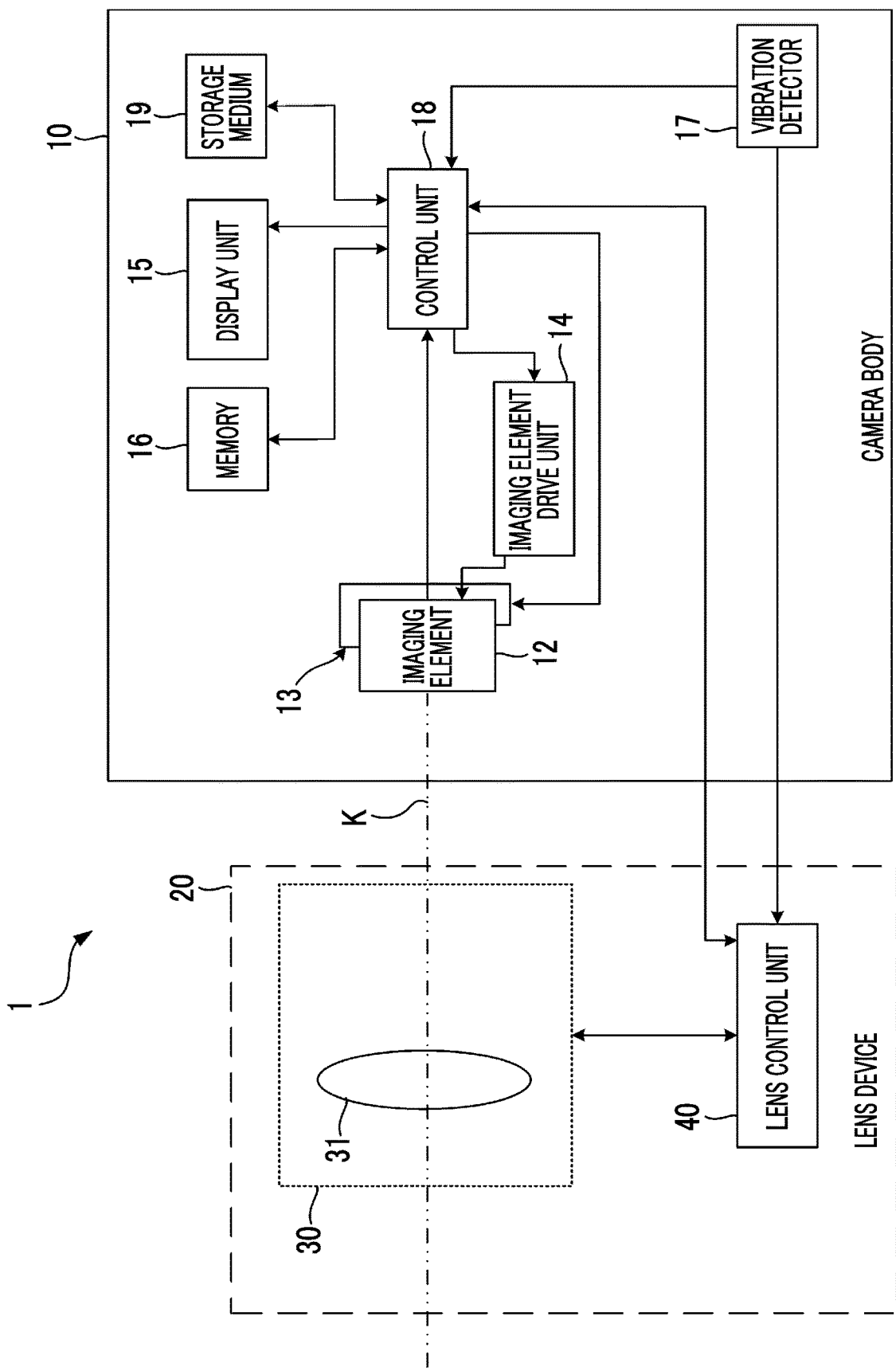
FIG. 1 is a diagram schematically illustrating a schematic configuration of a digital camera 1 that is one embodiment of an imaging apparatus according to the present invention.
Figure 2:
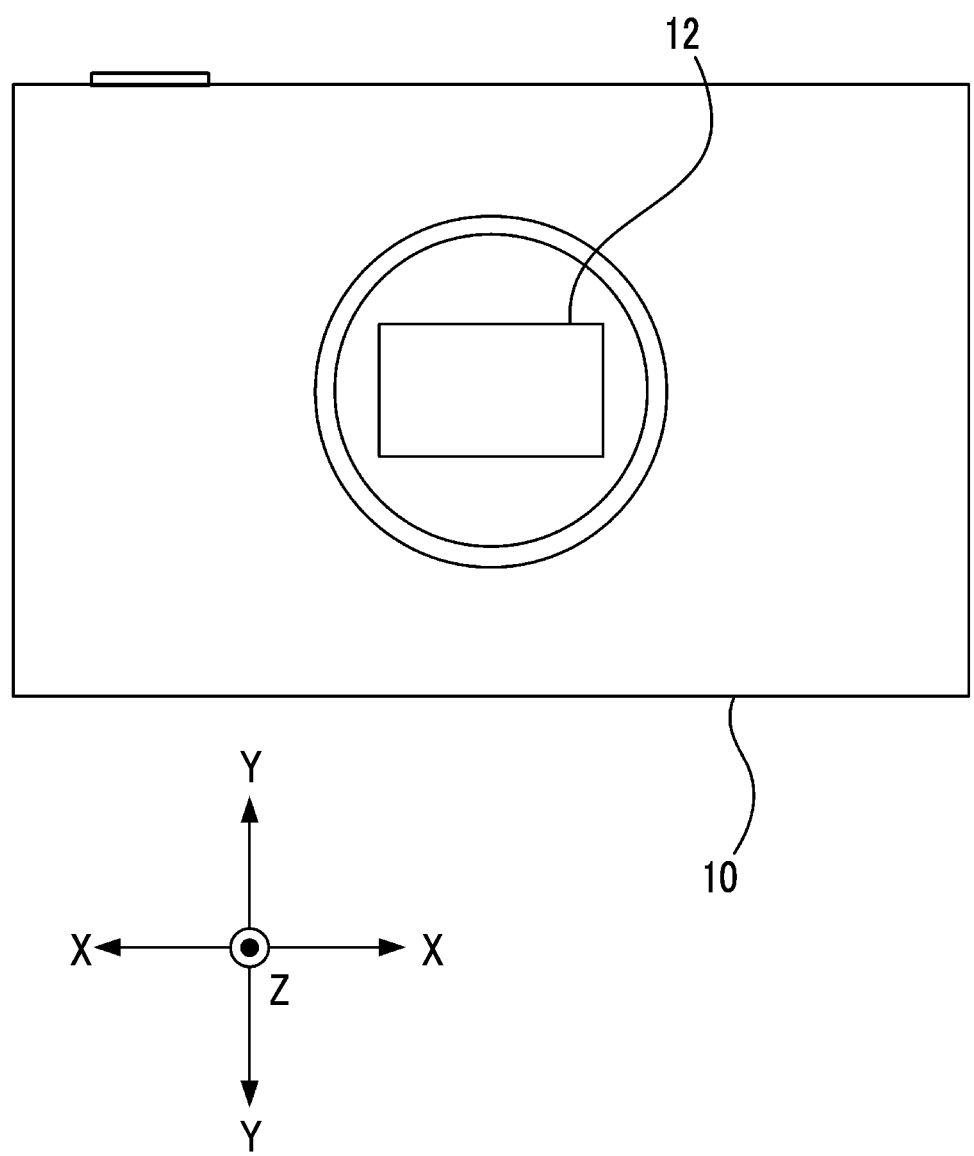
FIG. 2 is a front view schematically illustrating an exterior of a camera body 10 of the digital camera 1.

FIG. 1 is a diagram schematically illustrating a schematic configuration of a digital camera 1 that is one embodiment of an imaging apparatus according to the present invention. FIG. 2 is a front view schematically illustrating an exterior of a camera body 10 of the digital camera 1. The digital camera 1 comprises a camera body 10 and a lens device 20. The lens device 20 is attachably and detachably, in other words, interchangeably, configured with respect to the camera body 10. The lens device 20 may be integrated with the camera body 10.

The lens device 20 includes an imaging optical system 30 and a lens control unit 40. The imaging optical system 30 comprises an imaging lens 31 and a stop mechanism and the like, not illustrated. For example, the imaging lens 31 includes a lens for adjusting a focal point of the imaging optical system 30. The lens control unit 40 is mainly configured with a processor and controls driving of the imaging optical system 30 under control of a control unit 18, described later.

The camera body 10 comprises an imaging element 12, an imaging element shift mechanism 13, an imaging element drive unit 14, a display unit 15 that is a display device such as a liquid crystal display or an organic electro luminescence (EL) display, a memory 16 including a random access memory (RAM) as a volatile memory in which information is temporarily stored, a read only memory (ROM) as a non-volatile memory in which a program and various information necessary for an operation of the program are stored in advance, and the like, a vibration detector 17, the control unit 18 constituting a control device of the imaging apparatus, and a storage medium 19 such as a memory card configured with a non-volatile memory.

The imaging element 12 images a subject through the imaging optical system 30. The imaging element 12 is configured with a charge coupled device (CCD) image sensor, a complementary metal oxide semiconductor (CMOS) image sensor, or the like. As illustrated in FIG. 2, the imaging element 12 has a rectangular shape. Hereinafter, a direction along a short side of the imaging element 12 will be referred to as a direction Y, and a direction along a long side of the imaging element 12 will be referred to as a direction X. In addition, a direction (a direction in which an optical axis K of the imaging optical system 30 extends) perpendicular to a light-receiving surface of the imaging element 12 will be referred to as a direction Z. In addition, an axis extending in the direction X will be referred to as a yaw axis, an axis extending in the direction Y will be referred to as a pitch axis, and an axis extending in the direction Z will be referred to as a roll axis.

The imaging element shift mechanism 13 is a mechanism for preventing a shake of an image captured by the imaging element 12 by moving the imaging element 12 in a plane (hereinafter, referred to as an XY plane) perpendicular to the optical axis K of the imaging optical system 30. The imaging element shift mechanism 13 is configured to move the imaging element 12 in each of three directions of the direction X, the direction Y, and a rotation direction about a rotation axis that passes through a center of the light-receiving surface of the imaging element 12 and extends along the optical axis K.

The vibration detector 17 is a sensor for detecting a rotational vibration (a vibration caused by rotation of the digital camera 1 about each of the yaw axis, the pitch axis, and the roll axis) and constitutes a first vibration detector. The vibration detector 17 is configured with a three-axis angular velocity sensor that outputs each of information about an angular velocity about the yaw axis, information about an angular velocity about the pitch axis, and information about an angular velocity about the roll axis. Hereinafter, the information about the angular velocity about the yaw axis, the information about the angular velocity about the pitch axis, and the information about the angular velocity of the roll axis output from the vibration detector 17 will be referred to as yaw rotation data, pitch rotation data, and roll rotation data, respectively. Each of the yaw rotation data, the pitch rotation data, and the roll rotation data constitutes first output data.

The control unit 18 manages and controls the entire digital camera 1. A hardware structure of the control unit 18 corresponds to various processors that perform processing by executing programs including a control program.

The various processors include a central processing unit (CPU) that is a general-purpose processor performing various types of processing by executing a program, a programmable logic device (PLD) that is a processor of which a circuit configuration can be changed after manufacturing like a field programmable gate array (FPGA), or a dedicated electric circuit that is a processor having a circuit configuration dedicatedly designed to execute a specific type of processing like an application specific integrated circuit (ASIC). More specifically, a structure of the various processors is an electric circuit in which circuit elements such as semiconductor elements are combined. The control unit 18 may be configured with one of the various processors or may be configured with a combination of two or more processors of the same type or different types (for example, a combination of a plurality of FPGAs or a combination of a CPU and an FPGA).

The control unit 18 causes the imaging element 12 to image the subject by controlling the imaging element drive unit 14 and outputs a captured image signal corresponding to the subject image formed on the light-receiving surface of the imaging element 12 from the imaging element 12. The control unit 18 generates image data of a format such as Joint Photographic Experts Group (JPEG) format reproducible by the digital camera 1 or another apparatus by performing image processing on the captured image signal output from the imaging element 12. An image based on the image data will be referred to as a captured image.

In causing the imaging element 12 to image the subject, the control unit 18 performs shake correction of correcting a shake of the captured image caused by at least the rotational vibration of the digital camera 1. A shake amount of the captured image caused by the rotational vibration of the digital camera 1 includes a yaw component caused by rotation (yaw rotation) about the yaw axis, a pitch component caused by rotation (pitch rotation) about the pitch axis, and a roll component caused by rotation (roll rotation) about the roll axis.

The control unit 18 derives the yaw component based on the yaw rotation data of the vibration detector 17, derives the pitch component based on the pitch rotation data of the vibration detector 17, and derives the roll component based on the roll rotation data of the vibration detector 17. The control unit 18 derives a movement amount in the direction Y of the imaging element 12 necessary for canceling out the shake caused by the yaw rotation as a second shake correction amount By based on the derived yaw component. The control unit 18 performs the shake correction by moving the imaging element 12 in the direction Y by the second shake correction amount By. The control unit 18 derives a movement amount in the direction X of the imaging element 12 necessary for canceling out the shake caused by the pitch rotation as a second shake correction amount Bx based on the derived pitch component. The control unit 18 performs the shake correction by moving the imaging element 12 in the direction X by the second shake correction amount Bx. The control unit 18 derives a movement amount in the rotation direction of the imaging element 12 necessary for canceling out the shake caused by the roll rotation as a second shake correction amount Bz based on the derived roll component. The control unit 18 performs the shake correction by rotating the imaging element 12 about the light-receiving surface by the second shake correction amount Bz.

Here, while the shake correction is performed by moving the imaging element 12, the shake correction may be performed by moving a vibration-proof lens included in the imaging optical system 30, or the shake correction may be performed by moving both of the imaging element 12 and the vibration-proof lens.

Method of Deriving Second Shake Correction Amount

Each of the yaw rotation data, the pitch rotation data, and the roll rotation data of the vibration detector 17 includes an offset component. The control unit 18 derives a rotation angle θx of the digital camera 1 about the yaw axis by integrating the yaw rotation data of a predetermined time and performing processing of removing the offset component on the data after integration. The control unit 18 converts the rotation angle θx into a movement amount of the digital camera 1 in the direction Y on the XY plane and derives the movement amount in the direction Y of the imaging element 12 necessary for offsetting the movement amount as the second shake correction amount By corresponding to the yaw component.

The control unit 18 derives a rotation angle θy of the digital camera 1 about the pitch axis by integrating the pitch rotation data of the predetermined time and performing the processing of removing the offset component on the data after integration. The control unit 18 converts the rotation angle θy into a movement amount in the direction X on the XY plane and derives the movement amount in the direction X of the imaging element 12 necessary for offsetting the movement amount as the second shake correction amount Bx corresponding to the pitch component.

The control unit 18 derives a rotation angle θz of the digital camera 1 about the roll axis by integrating the roll rotation data of the predetermined time and performing the processing of removing the offset component on the data after integration. The control unit 18 converts the rotation angle θz into a movement amount in the rotation direction on the XY plane and derives a rotation amount of the imaging element 12 necessary for offsetting the movement amount as the second shake correction amount Bz corresponding to the roll component. The control unit 18 performs the shake correction by moving the imaging element 12 based on the above three second shake correction amounts.

For example, the processing of removing the offset component is processing of performing high-pass filter processing on the first output data of the predetermined time. The control unit 18 may also derive the rotation angles θx, θy, and θz of the digital camera 1 by performing the processing of removing the offset component on the first output data of the predetermined time before integration and integrating the data after processing.

Performing the processing of removing the offset component can suppress an effect, on accuracy of the shake correction, of the offset component included in an output of the vibration detector 17. However, the offset component may change over time. In the present embodiment, the control unit 18 can handle the change in the offset component by performing offset derivation processing of deriving the offset component of the vibration detector 17. Hereinafter, the offset derivation processing will be described in detail.

Offset Derivation Processing

In order to derive the offset component, the control unit 18 derives an image shake amount related to the shake of the captured image and a first shake correction amount corresponding to the shake of the captured image caused by the vibration of the digital camera 1.

First Shake Correction Amount

The first shake correction amount is information derived as a movement amount of the imaging element 12 necessary for offsetting a movement amount obtained by converting data obtained by integrating the first output data of the predetermined time without performing the processing of removing the offset component into a movement amount on the XY plane.

The control unit 18 derives the rotation angle θx of the digital camera 1 about the yaw axis by integrating the yaw rotation data of the predetermined time. The control unit 18 converts the rotation angle θx into a movement amount in the direction Y on the XY plane and derives the movement amount in the direction Y of the imaging element 12 necessary for offsetting the movement amount as a first shake correction amount Ay corresponding to the yaw component.

The control unit 18 derives the rotation angle θy of the digital camera 1 about the pitch axis by integrating the pitch rotation data of the predetermined time. The control unit 18 converts the rotation angle θy into a movement amount in the direction X on the XY plane and derives the movement amount in the direction X of the imaging element 12 necessary for offsetting the movement amount as a first shake correction amount Ax corresponding to the pitch component.

The control unit 18 derives the rotation angle θz of the digital camera 1 about the roll axis by integrating the roll rotation data of the predetermined time. The control unit 18 converts the rotation angle θz into a movement amount in the rotation direction on the XY plane and derives a rotation amount of the imaging element 12 necessary for offsetting the movement amount as a first shake correction amount Az corresponding to the roll component.

Since the first shake correction amount is derived without performing the processing of removing the offset component on the first output data, the first shake correction amount is larger than the above second shake correction amount. Since the first shake correction amount includes information about a movement amount corresponding to the offset component, it is not desirable to use the first shake correction amount for the shake correction. In the digital camera 1, the first shake correction amount is not used for the shake correction and is used for deriving the offset component.

First Image Shake Amount

A first image shake amount is a movement vector (a shake amount between pieces of the image data) among a plurality of pieces of the image data obtained by imaging by the imaging element 12 during the shake correction. A case where imaging is performed at a time point t1 and an immediately subsequent time point t2 in a state where the shake correction is performed is assumed. A movement vector (a movement vector in the direction X, a movement vector in the direction Y, and a movement vector in the rotation direction) of the image data obtained by imaging at the time point t2 with respect to the image data obtained by imaging at the time point t1 corresponds to the shake amount of the captured image that is not corrected by the shake correction.

The control unit 18 derives the first image shake amount by converting the movement vector among the plurality of pieces of the image data into the movement amount of the imaging element 12 on the XY plane. Specifically, the control unit 18 derives each of a first image shake amount Cx in the direction X, a first image shake amount Cy in the direction Y, and a first image shake amount Cz in the rotation direction. Each of the first image shake amount Cx, the first image shake amount Cy, and the first image shake amount Cz is zero in a case where the above processing of removing the offset component is appropriately performed. However, the processing of removing the offset component is decided based on the offset component actually measured at a time of shipment of the digital camera 1. Thus, in a case where the offset component changes from its state at the time of shipment, the first image shake amount Cx, the first image shake amount Cy, and the first image shake amount Cz may not be zero.

Hereinafter, the first image shake amount in the direction X that is obtained in a case where an assumption that the shake correction is performed based on the first shake correction amount is made and that is derived from the image data captured during the shake correction will be referred to as a second image shake amount Dx. The first image shake amount in the direction Y will be referred to as a second image shake amount Dy. The first image shake amount in the rotation direction will be referred to as a second image shake amount Dz. The second image shake amount Dx, the second image shake amount Dy, and the second image shake amount Dz correspond to integrated data of the offset component of the pitch rotation data of the vibration detector 17, integrated data of the offset component of the yaw rotation data of the vibration detector 17, and integrated data of the offset component of the roll rotation data of the vibration detector 17, respectively.

In addition, the movement amount in the direction X converted from the actual rotation angle of the digital camera 1 about the yaw axis will be referred to as a shake amount Tx. The movement amount in the direction Y converted from the actual rotation angle of the digital camera 1 about the pitch axis will be referred to as a shake amount Ty. The movement amount in the rotation direction converted from the actual rotation angle of the digital camera 1 about the roll axis will be referred to as a shake amount Tz. In a case where the above is defined, a relationship among the following six equations is obtained.

$$Tx - Bx = Cx \quad (A1)$$

$$Ty - By = Cy \quad (A2)$$

$$Tz - Bz = Cz \quad (A3)$$

$$Tx - Ax = Dx \quad (B1)$$

$$Ty - Ay = Dy \quad (B2)$$

$$Tz - Az = Dz \quad (B3)$$

In the six equations, the first shake correction amounts Ax, Ay, and Az, the second shake correction amounts Bx, By, and Bz, and the first image shake amounts Cx, Cy, and Cz can be obtained during imaging. In a case where Equation (A1) and Equation (B1) are solved with respect to the second image shake amount Dx corresponding to the offset component, Equation (C1) below is obtained. Similarly, in a case where Equation (A2) and Equation (B2) are solved with respect to the second image shake amount Dy corresponding to the offset component, Equation (C2) below is obtained. In a case where Equation (A3) and Equation (B3) are solved with respect to the second image shake amount Dz corresponding to the offset component, Equation (C3) below is obtained.

$$Dx = Bx + Cx - Ax \quad (C1)$$

$$Dy = By + Cy - Ay \quad (C2)$$

$$Dz = Bz + Cz - Az \quad (C3)$$

Accordingly, the control unit 18 can derive the integrated data of the offset component of the yaw rotation data, the integrated data of the offset component of the pitch rotation data, and the integrated data of the offset component of the roll rotation data by performing calculations of Equation (C1), Equation (C2), and Equation (C3). The control unit 18 derives the offset component (angular velocity) of the yaw rotation data, the offset component (angular velocity) of the pitch rotation data, and the offset component (angular velocity) of the roll rotation data by differentiating the integrated data of the predetermined time. By using the derived offset components, for example, the accuracy of the shake correction based on the first shake correction amount can be improved by appropriately changing parameters used in the processing of removing the offset component or correcting the first shake correction amount.

Figure 3:
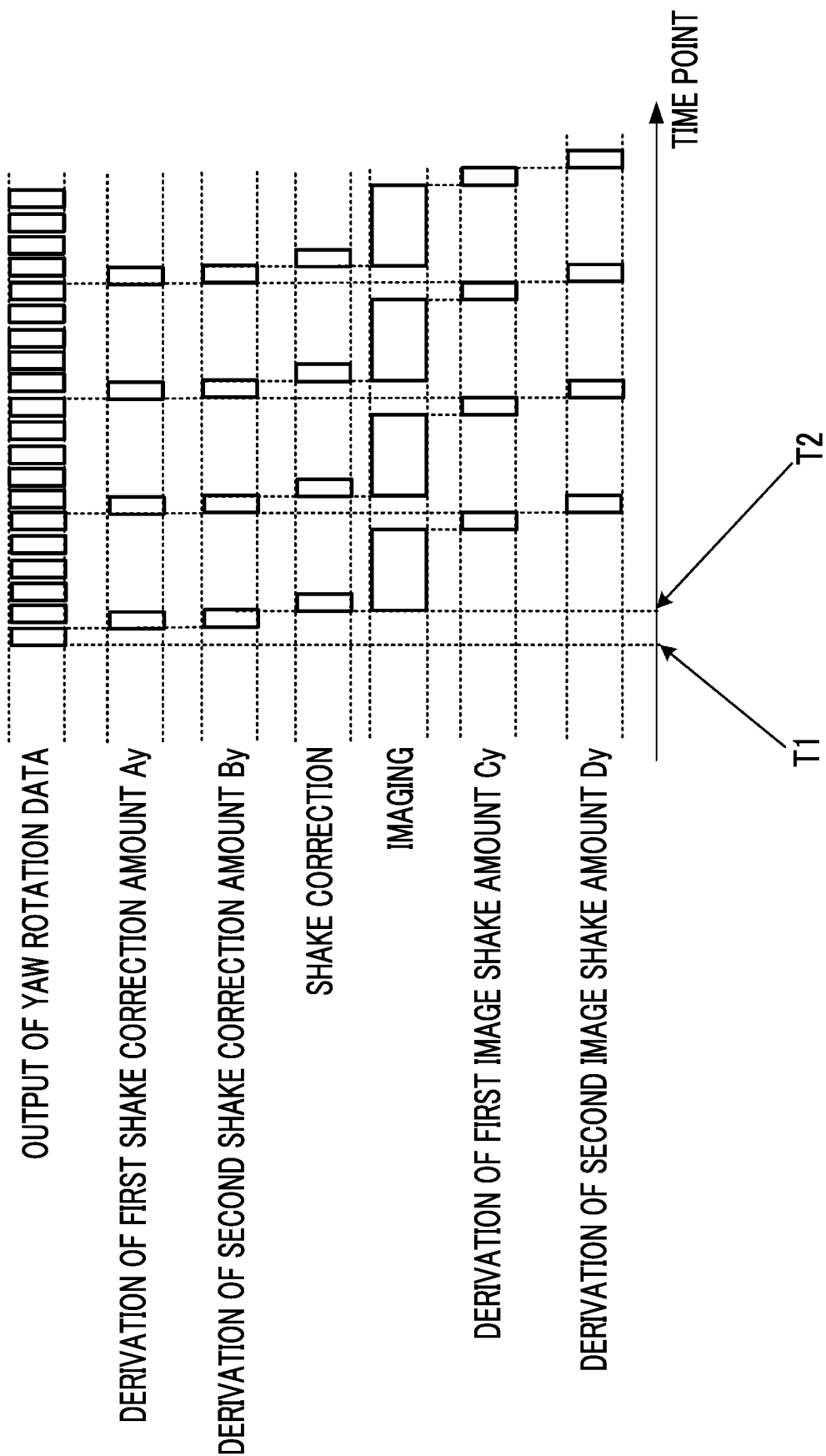
FIG. 3 is a timing chart for describing an operation of a control unit 18 at a time of offset component derivation processing.

FIG. 3 is a timing chart for describing an operation of the control unit 18 at a time of the offset component derivation processing. In FIG. 3, an operation example in a case where the offset component of the yaw rotation data is derived is illustrated. In a case where the yaw rotation data is output from the vibration detector 17 at a time point T1, the first shake correction amount Ay and the second shake correction amount By are derived based on the yaw rotation data, and the shake correction is performed based on the second shake correction amount By. In a case where the shake correction is started, imaging by the imaging element 12 is started at a time point T2. In a case where the control unit 18 acquires the image data obtained by imaging, the first image shake amount Cy is derived. The second image shake amount Dy is derived based on the first shake correction amount Ay, the second shake correction amount By, and the first image shake amount Cy derived so far. A plurality of the second image shake amounts Dy of the predetermined time are derived by repeating the above processing, and the offset component of the yaw rotation data is derived by differentiating the plurality of second image shake amounts Dy with respect to time.

For example, the control unit 18 executes the offset component derivation processing at a predetermined timing such as at a time of starting an imaging mode of the digital camera 1. Accordingly, the accuracy of the shake correction can be maintained independently of the change in the offset component based on a change over time or the like. According to the digital camera 1, the offset component can be derived based on the image data obtained while performing the shake correction based on the first output data from which the offset component is removed and based on the first output data of the vibration detector 17. Thus, the offset component can be derived without decreasing quality of a live view image.

In a case where image data that does not satisfy a predetermined condition is included in the plurality of pieces of the image data obtained during the shake correction, it is preferable that the control unit 18 derives the first image shake amount based on the image data except the image data that does not satisfy the predetermined condition. For example, the predetermined condition is that derivation accuracy of the movement vector is decreased, and corresponds to a case where significant blurriness occurs in the image data. The offset component can be derived with high accuracy by not using the image data with which the derivation accuracy of the movement vector may be decreased, for deriving the first image shake amount.

In addition, in deriving the first image shake amount, it is preferable that a shutter speed of the imaging element 12 set at a time of imaging for obtaining each of the plurality of pieces of the image data used for acquiring the first image shake amount is set to be higher than the shutter speed of the imaging element 12 set at the time of imaging in a case of not deriving the first image shake amount. By doing so, the shake can be decreased in each image data, and the first image shake amount can be derived with high accuracy.

In addition, in an imaging period for acquiring the first image shake amount, in a case where a vibration of a high frequency greater than or equal to an imaging frame rate occurs in the digital camera 1, it is difficult to accurately obtain the movement vector. Thus, it is preferable that low-pass filter processing of which a cut-off frequency is a frequency (30 Hz in a case where the imaging frame rate is 30 fps) corresponding to the imaging frame rate is performed on the first output data of the vibration detector 17 and the first image shake amount. By doing so, an effect of the vibration of the high frequency can be excluded, and the offset component can be derived with high accuracy.

In addition, in a situation where the vibration of the digital camera 1 is increased as in a state where, for example, a user of the digital camera 1 is walking or the user is performing a pan or a tilt, it is preferable to not execute the offset derivation processing. For example, it is preferable that the control unit 18 determines whether or not the digital camera 1 is in a situation where one specific point is continuously imaged or a situation where a change in angle of view is small, and executes the offset derivation processing only in a case where a determination that the digital camera 1 is in such a situation is made. By doing so, the offset component can be derived with high accuracy.

Information (the first shake correction amount, the second shake correction amount, and the first image shake amount) necessary for the calculations of Equation (C1), Equation (C2), and Equation (C3) is derived based on output data from the imaging element 12 and the vibration detector 17 that are different devices. Accordingly, it is necessary to synchronize outputs of the imaging element 12 and the vibration detector 17 with each other. The control unit 18 decides a combination of the image data and the first output data in synchronization based on information (referred to as synchronization information) about a difference between a start timing (time point T2 in FIG. 3) of imaging by the imaging element 12 and an output timing (time point T1 in FIG. 3) of the first output data used for the shake correction performed immediately before the start of imaging or during imaging, and derives the information (the first shake correction amount, the second shake correction amount, and the first image shake amount) necessary for the calculations of Equation (C1), Equation (C2), and Equation (C3) from the image data and the first output data of the decided combination. The synchronization information is experimentally obtained in advance and stored in the memory 16.

The control unit 18 may generate the synchronization information instead of acquiring the synchronization information from the memory 16. For example, the control unit 18 derives each of the first shake correction amount Ay, the second shake correction amount By, and the first image shake amount Cy of the predetermined time by setting the synchronization information to a predetermined initial value (for example, n seconds) and starting continuous imaging by the imaging element 12, and derives the second image shake amount Dy based on the first shake correction amount Ay, the second shake correction amount By, and the first image shake amount Cy in synchronization based on the synchronization information having the initial value.

The control unit 18 determines a similarity between a function f(By) indicating a change in time of the second shake correction amount By and a function obtained by subtracting a function f(Dy) indicating a change in time of the derived second image shake amount Dy from a function f(By−Ay) indicating a change in time of a value obtained by subtracting the first shake correction amount Ay in synchronization with the second shake correction amount By from the second shake correction amount By. The control unit 18 repeats processing of obtaining the similarity while gradually shifting the synchronization information from the initial value and stores the value of the synchronization information in a case where the similarity is the smallest in the memory as a confirmed value of the synchronization information. From now on, the combination of the image data and the first output data in synchronization is decided based on the confirmed value.

It is preferable that such processing of generating the synchronization information is executed at a defined timing such as at a time of starting the digital camera 1 or at a time of changing the imaging mode. In addition, it is preferable that instead of using the synchronization information in common among the yaw rotation data, the pitch rotation data, and the roll rotation data, the control unit 18 separately generates synchronization information for synchronization between the output timing of the yaw rotation data and an imaging timing, synchronization information for synchronization between the output timing of the pitch rotation data and the imaging timing, and synchronization information for synchronization between the output timing of the roll rotation data and the imaging timing. By doing so, the synchronization information can be more accurately generated. The above synchronization information constitutes first synchronization data.

Modification Example of Offset Derivation Processing

It is preferable that the digital camera 1 further comprises an acceleration sensor as a second vibration detector that detects a translational vibration (a vibration caused by moving the digital camera 1 in at least one of the direction X or the direction Y while the light-receiving surface of the imaging element 12 is parallel to the XY plane). The acceleration sensor can detect a movement of the digital camera 1 in a direction along the light-receiving surface of the imaging element 12 and detects each of the movement in the direction X and the movement in the direction Y. Information about the movement in the direction X output from the acceleration sensor will be referred to as x output data, and information about the movement in the direction Y output from the acceleration sensor will be referred to as y output data. Each of the x output data and the y output data constitutes second output data.

Hereinafter, a movement amount in the direction X of the digital camera 1 derived based on the x output data will be referred to as a first movement amount Mx, and a movement amount of the imaging element 12 necessary for correcting the shake of the captured image caused by the first movement amount Mx will be referred to as a third shake correction amount Gx. In addition, a movement amount in the direction Y of the digital camera 1 derived based on the y output data will be referred to as a first movement amount My, and a movement amount of the imaging element 12 necessary for correcting the shake of the captured image caused by the first movement amount My will be referred to as a third shake correction amount Gy. In a case where the digital camera 1 further comprises the acceleration sensor, it is preferable to change the offset derivation processing as follows. The third shake correction amount Gx is obtained by double integrating the x output data of the predetermined time. The third shake correction amount Gy is obtained by double integrating the y output data of the predetermined time.

The above shake amount Tx, the shake amount Ty, and the shake amount Tz actually occurring in the digital camera 1 have been described on a premise that only the rotational vibration occurs in the digital camera 1. Accordingly, in a case where the translational vibration occurs in the digital camera 1, it is necessary to correct the first shake correction amount by considering the shake of the captured image caused by the rotational vibration. Specifically, it is necessary to substitute Equation (B1) and Equation (B2) with Equation (B1a) and Equation (B2a) below.

$$Tx-(Ax+Gx)=Dx \quad (B1a)$$

$$Ty-(Ay+Gy)=Dy \quad (B2a)$$

In a case where Equation (B1a) and Equation (A1) are solved with respect to the second image shake amount Dx corresponding to the offset component, Equation (C1a) below is obtained. Similarly, in a case where Equation (B2a) and Equation (A2) are solved with respect to the second image shake amount Dy corresponding to the offset component, Equation (C2a) below is obtained.

$$Dx=Bx+Cx-(Ax+Gx) \quad (C1a)$$

$$Dy=By+Cy-(Ay+Gy) \quad (C2a)$$

The control unit 18 derives the offset component of the yaw rotation data and the offset component of the pitch rotation data by performing calculations of Equation (C1a) and Equation (C2a) by deriving the first movement amounts Mx and My of the digital camera 1 based on the second output data output from the acceleration sensor and deriving the third shake correction amounts Gx and Gy necessary for correcting the shake of the captured image caused by the first movement amounts Mx and My. The derivation of the offset component of the roll rotation data is the same as in a case of not using the acceleration sensor.

By using the output data of the acceleration sensor, the first shake correction amount can be corrected using the shake amount of the captured image caused by the translational vibration, and the offset component can be more accurately derived.

Next, a configuration of a smartphone that is another embodiment of the imaging apparatus according to the present invention will be described.

Figure 4:
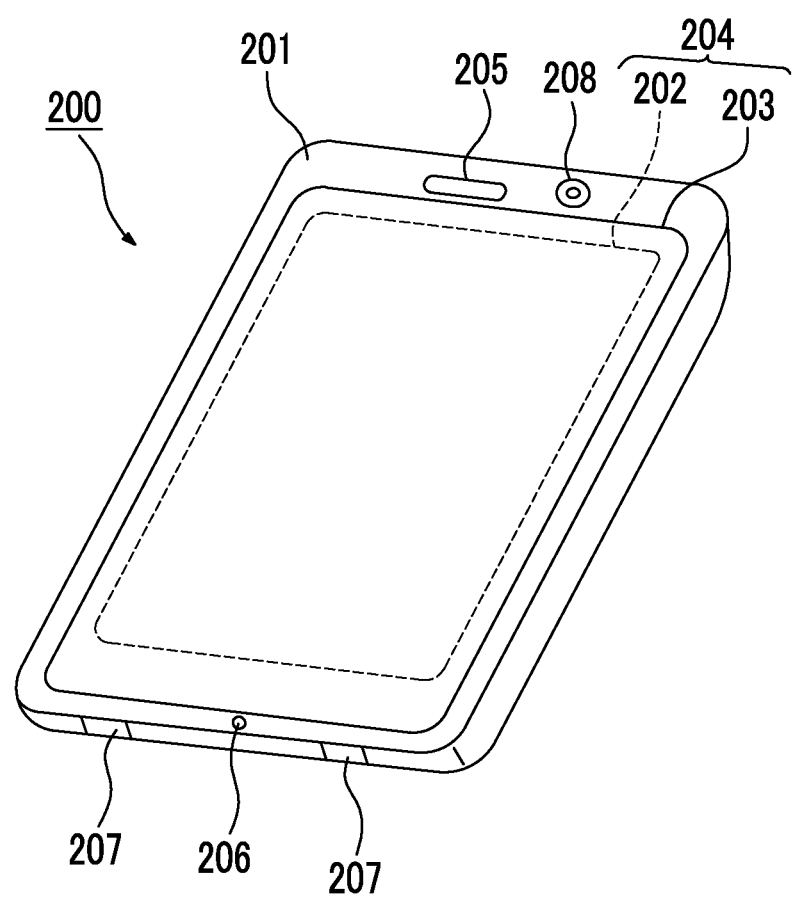
FIG. 4 illustrates an exterior of a smartphone 200.

FIG. 4 illustrates an exterior of a smartphone 200. The smartphone 200 illustrated in FIG. 4 includes a casing 201 having a flat plate shape and comprises a display and input unit 204 in which a display panel 202 as a display unit and an operation panel 203 as an input unit are integrated on one surface of the casing 201.

The casing 201 comprises a speaker 205, a microphone 206, an operation unit 207, and a camera unit 208. The configuration of the casing 201 is not limited thereto and can employ, for example, a configuration in which the display unit and the input unit are independently disposed, or a configuration that has a folded structure or a sliding mechanism.

Figure 5:
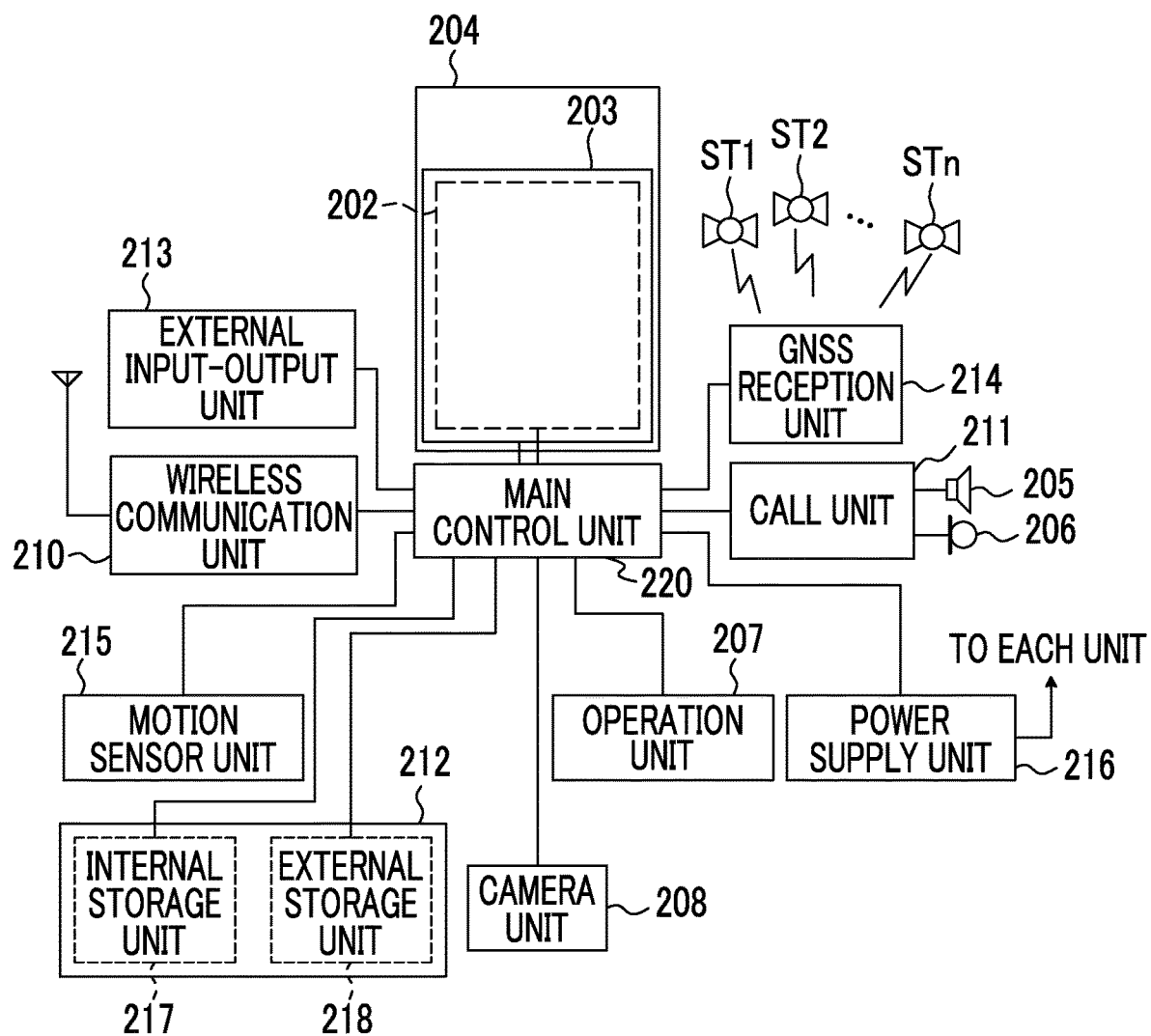
FIG. 5 is a block diagram illustrating a configuration of the smartphone 200 illustrated in FIG. 4.

FIG. 5 is a block diagram illustrating a configuration of the smartphone 200 illustrated in FIG. 4.

As illustrated in FIG. 5, a wireless communication unit 210, the display and input unit 204, a call unit 211, the operation unit 207, the camera unit 208, a storage unit 212, an external input-output unit 213, a global navigation satellite system (GNSS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and detects a user operation with respect to the displayed information under control of the main control unit 220. The display and input unit 204 comprises the display panel 202 and the operation panel 203.

A liquid crystal display (LCD), an organic electro-luminescence display (OELD), or the like is used as a display device in the display panel 202.

The operation panel 203 is a device that is placed such that an image displayed on the display surface of the display panel 202 can be visually recognized, is operated by a finger of the user or a stylus, and detects one or a plurality of coordinates. In a case where the device is operated by the finger of the user or the stylus, a detection signal generated by the operation is output to the main control unit 220. Next, the main control unit 220 detects an operation position (coordinates) on the display panel 202 based on the received detection signal.

As illustrated in FIG. 5, while the display panel 202 and the operation panel 203 of the smartphone 200 illustrated as the imaging apparatus according to one embodiment of the present invention are integrated and constitute the display and input unit 204, the operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part overlapping with the display panel 202 and a detection region (hereinafter, referred to as a non-display region) for an outer edge portion other than the overlapping part that does not overlap with the display panel 202.

A size of the display region and a size of the display panel 202 may completely match, but both sizes do not need to match. In addition, the operation panel 203 may comprise two sensitive regions of the outer edge portion and an inner part other than the outer edge portion. Furthermore, a width of the outer edge portion is appropriately designed depending on a size and the like of the casing 201.

Furthermore, as a position detection type employed in the operation panel 203, a matrix switch type, a resistive film type, a surface acoustic wave type, an infrared type, an electromagnetic induction type, a capacitance type, and the like are exemplified, and any of the types can be employed.

The call unit 211 comprises the speaker 205 or the microphone 206 and converts voice of the user input through the microphone 206 into voice data processable in the main control unit 220 and outputs the voice data to the main control unit 220, or decodes voice data received by the wireless communication unit 210 or the external input-output unit 213 and outputs the decoded voice data from the speaker 205.

In addition, as illustrated in FIG. 4, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 4, the operation unit 207 is a push-button type switch that is mounted on a side surface of the casing 201 of the smartphone 200 and is set to an ON state in a case where the switch is pressed by the finger or the like, and set to an OFF state by restoring force of a spring or the like in a case where the finger is released.

In the storage unit 212, a control program and control data of the main control unit 220, application software, address data in which a name, a telephone number, or the like of a communication counterpart is associated, transmitted and received electronic mail data, web data downloaded by web browsing, and downloaded contents data are stored, and streaming data or the like is temporarily stored. In addition, the storage unit 212 is configured with an internal storage unit 217 incorporated in the smartphone and an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 is an interface with all external apparatuses connected to the smartphone 200 and is directly or indirectly connected to other external apparatuses by communication (for example, Universal Serial Bus (USB), IEEE1394, Bluetooth (registered trademark), radio frequency identification (RFID), infrared communication (Infrared Data Association (IrDA) (registered trademark)), Ultra Wideband (UWB) (registered trademark), or ZigBee (registered trademark)) or through a network (for example, the Ethernet (registered trademark) or a wireless local area network (LAN)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GNSS reception unit 214 receives GNSS signals transmitted from GNSS satellites ST1 to STn, executes positioning computation based on the received plurality of GNSS signals, and detects a position that includes a latitude, a longitude, and an altitude of the smartphone 200 in accordance with an instruction from the main control unit 220. In a case where positional information can be acquired from the wireless communication unit 210 or the external input-output unit 213 (for example, a wireless LAN), the GNSS reception unit 214 can detect the position using the positional information.

The motion sensor unit 215 comprises, for example, a three-axis acceleration sensor and detects a physical movement of the smartphone 200 in accordance with an instruction from the main control unit 220. By detecting the physical movement of the smartphone 200, a movement direction or acceleration of the smartphone 200 is detected. A detection result is output to the main control unit 220.

The power supply unit 216 supplies power stored in a battery (not illustrated) to each unit of the smartphone 200 in accordance with an instruction from the main control unit 220.

The main control unit 220 comprises a microprocessor, operates in accordance with the control program and the control data stored in the storage unit 212, and manages and controls each unit of the smartphone 200. The microprocessor of the main control unit 220 has the same function as the control unit 18. In addition, the main control unit 220 has a mobile communication control function of controlling each unit of a communication system and an application processing function for performing voice communication or data communication through the wireless communication unit 210.

The application processing function is implemented by operating the main control unit 220 in accordance with the application software stored in the storage unit 212. For example, the application processing function is an infrared communication function of performing data communication with counter equipment by controlling the external input-output unit 213, an electronic mail function of transmitting and receiving electronic mails, or a web browsing function of browsing a web page.

In addition, the main control unit 220 has an image processing function such as displaying an image on the display and input unit 204 based on image data (data of a still image or a motion image) such as reception data or downloaded streaming data.

The image processing function refers to a function of causing the main control unit 220 to decode the image data, perform image processing on the decoding result, and display an image on the display and input unit 204.

Furthermore, the main control unit 220 executes a display control for the display panel 202 and an operation detection control for detecting the user operation through the operation unit 207 and the operation panel 203.

By executing the display control, the main control unit 220 displays an icon for starting the application software or a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation through the operation unit 207, receives an operation with respect to the icon and an input of a text string in an input field of the window through the operation panel 203, or receives a request for scrolling the display image through the scroll bar.

Furthermore, by executing the operation detection control, the main control unit 220 is provided with a touch panel control function of determining whether the operation position on the operation panel 203 is in the overlapping part (display region) overlapping with the display panel 202 or the other outer edge portion (non-display region) not overlapping with the display panel 202 and controlling the sensitive region of the operation panel 203 or a display position of the software key.

In addition, the main control unit 220 can detect a gesture operation with respect to the operation panel 203 and execute a preset function depending on the detected gesture operation.

The gesture operation is not a simple touch operation in the related art and means an operation of drawing a trajectory by the finger or the like, designating a plurality of positions at the same time, or drawing a trajectory for at least one of the plurality of positions as a combination thereof.

The camera unit 208 includes the lens device 20, the imaging element 12, the imaging element shift mechanism 13, the imaging element drive unit 14, and the vibration detector 17 illustrated in FIG. 1.

Captured image data generated by the camera unit 208 can be stored in the storage unit 212 or be output through the external input-output unit 213 or the wireless communication unit 210.

In the smartphone 200 illustrated in FIG. 5, the camera unit 208 is mounted on the same surface as the display and input unit 204. However, a mount position of the camera unit 208 is not limited thereto. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in a case where the GNSS reception unit 214 detects the position, the position can be detected by referring to the image from the camera unit 208. Furthermore, by referring to the image from the camera unit 208, an optical axis direction of the camera unit 208 of the smartphone 200 can be determined, or the current usage environment can be determined without using the three-axis acceleration sensor or by using the three-axis acceleration sensor together. The image from the camera unit 208 can also be used in the application software.

Besides, image data of a still image or a motion image to which the positional information acquired by the GNSS reception unit 214, voice information (may be text information acquired by performing voice to text conversion by the main control unit or the like) acquired by the microphone 206, posture information acquired by the motion sensor unit 215, or the like is added can be stored in the storage unit 212 or be output through the external input-output unit 213 or the wireless communication unit 210.

As described above, at least the following matters are disclosed in the present specification.

(1)

A control device of an imaging apparatus including a first vibration detector and an imaging element, the control device comprising a processor, in which the processor is configured to derive a first shake correction amount corresponding to a shake caused by a vibration and a second shake correction amount different from the first shake correction amount based on first output data output from the first vibration detector, derive a first image shake amount related to a shake of an image based on image data obtained by imaging by the imaging element, and derive an offset component included in the first output data based on the first shake correction amount, the second shake correction amount, and the first image shake amount.

(2)

The control device according to (1), in which the second shake correction amount is smaller than the first shake correction amount.

(3)

The control device according to (2), in which the first shake correction amount is information not used for shake correction performed based on the first output data, and the second shake correction amount is information used for the shake correction.

(4)

The control device according to (2) or (3), in which the first shake correction amount is based on data obtained by integrating the first output data, and the second shake correction amount is based on data obtained by integrating data obtained by performing processing of removing the offset component on the first output data or based on data obtained by performing the processing of removing the offset component on the data obtained by integrating the first output data.

(5)

The control device according to any one of (1) to (4), in which the processor is configured to derive the offset component based on a value obtained by subtracting the first shake correction amount from an added value of the first image shake amount and the second shake correction amount.

(6)

The control device according to any one of (1) to (5), in which the first vibration detector is capable of detecting an angular velocity.

(7)

The control device according to any one of (1) to (4), in which the first vibration detector is capable of detecting an angular velocity, the imaging apparatus further includes a second vibration detector capable of detecting acceleration, the second vibration detector is capable of detecting a movement of the imaging apparatus in a direction along a light-receiving surface of the imaging element, and the processor is configured to derive a first movement amount of the imaging apparatus based on second output data output from the second vibration detector, and derive the offset component based on the first shake correction amount, the second shake correction amount, the first image shake amount, and a third shake correction amount necessary for correcting a shake caused by the first movement amount.

(8)

The control device according to (7), in which the processor is configured to derive the offset component based on a value obtained by subtracting an added value of the first shake correction amount and the third shake correction amount from an added value of the first image shake amount and the second shake correction amount.

(9)

The control device according to any one of (1) to (8), in which the processor is configured to derive a shake amount among a plurality of pieces of the image data as the first image shake amount, and in a case where image data that does not satisfy a predetermined condition is included in the plurality of pieces of the image data, derive the first image shake amount based on image data except the image data that does not satisfy the predetermined condition.

(10)

The control device according to any one of (1) to (9), in which the processor is configured to set a shutter speed of the imaging element set in a case of deriving the offset component to be higher than a shutter speed set in a case of not deriving the offset component.

(11)

The control device according to any one of (1) to (10), in which the processor is configured to acquire first synchronization data related to synchronization between an imaging timing of the imaging element and an output timing of the first output data, decide a combination of the image data and the first output data in synchronization based on the first synchronization data, and derive the offset component based on the first shake correction amount, the second shake correction amount, and the first image shake amount obtained from data of the decided combination.

(12)

An imaging apparatus comprising the control device according to any one of (1) to (11).

(13)

A control method of an imaging apparatus including a first vibration detector and an imaging element, the control method comprising deriving a first shake correction amount corresponding to a shake caused by a vibration and a second shake correction amount different from the first shake correction amount based on first output data output from the first vibration detector, deriving a first image shake amount related to a shake of an image based on image data obtained by imaging by the imaging element, and deriving an offset component included in the first output data based on the first shake correction amount, the second shake correction amount, and the first image shake amount.

(14)

A control program of an imaging apparatus including a first vibration detector and an imaging element, the control program causing a processor to execute deriving a first shake correction amount corresponding to a shake caused by a vibration and a second shake correction amount different from the first shake correction amount based on first output data output from the first vibration detector, deriving a first image shake amount related to a shake of an image based on image data obtained by imaging by the imaging element, and deriving an offset component included in the first output data based on the first shake correction amount, the second shake correction amount, and the first image shake amount.

EXPLANATION OF REFERENCES

1: digital camera
10: camera body
12: imaging element
13: imaging element shift mechanism
14: imaging element drive unit
15: display unit
16: memory
17: vibration detector
18: control unit
19: storage medium
20: lens device
30: imaging optical system
31: imaging lens
40: lens control unit
200: smartphone
201: casing
202: display panel
203: operation panel
204: display and input unit
205: speaker
206: microphone
208: camera unit
210: wireless communication unit
211: call unit
212: storage unit
213: external input-output unit
214: GNSS reception unit
215: motion sensor unit
216: power supply unit
217: internal storage unit
218: external storage unit
220: main control unit

What is claimed is:

1. A control device of an imaging apparatus including a first vibration detector and an imaging element, the control device comprising:
a processor,
wherein the processor is configured to:
derive a first shake correction amount corresponding to a shake caused by a vibration and a second shake correction amount different from the first shake correction amount, based on first output data output from the first vibration detector;
derive a first image shake amount related to a shake of an image based on image data obtained by imaging by the imaging element; and
derive an offset component included in the first output data, based on the first shake correction amount, the second shake correction amount, and the first image shake amount,
the first vibration detector is capable of detecting an angular velocity,
the imaging apparatus further includes a second vibration detector capable of detecting acceleration,
the second vibration detector is capable of detecting a movement of the imaging apparatus in a direction along a light-receiving surface of the imaging element, and
the processor is configured to:
derive a first movement amount of the imaging apparatus based on second output data output from the second vibration detector; and
derive the offset component based on the first shake correction amount, the second shake correction amount, the first image shake amount, and a third shake correction amount necessary for correcting a shake caused by the first movement amount.

2. The control device according to claim 1,
wherein the second shake correction amount is smaller than the first shake correction amount.

3. The control device according to claim 2,
wherein the first shake correction amount is information not used for shake correction performed based on the first output data, and
the second shake correction amount is information used for the shake correction.

4. The control device according to claim 2,
wherein the first shake correction amount is based on data obtained by integrating the first output data, and
the second shake correction amount is based on data obtained by integrating data obtained by performing processing of removing the offset component on the first output data or based on data obtained by performing the processing of removing the offset component on the data obtained by integrating the first output data.

5. The control device according to claim 3,
wherein the first shake correction amount is based on data obtained by integrating the first output data, and the second shake correction amount is based on data obtained by integrating data obtained by performing processing of removing the offset component on the first output data or based on data obtained by performing the processing of removing the offset component on the data obtained by integrating the first output data.

6. The control device according to claim 1,
wherein the processor is configured to derive the offset component based on a value obtained by subtracting the first shake correction amount from an added value of the first image shake amount and the second shake correction amount.

7. The control device according to claim 2,
wherein the processor is configured to derive the offset component based on a value obtained by subtracting the first shake correction amount from an added value of the first image shake amount and the second shake correction amount.

8. The control device according to claim 3,
wherein the processor is configured to derive the offset component based on a value obtained by subtracting the first shake correction amount from an added value of the first image shake amount and the second shake correction amount.

9. The control device according to claim 4,
wherein the processor is configured to derive the offset component based on a value obtained by subtracting the first shake correction amount from an added value of the first image shake amount and the second shake correction amount.

10. The control device according to claim 5,
wherein the processor is configured to derive the offset component based on a value obtained by subtracting the first shake correction amount from an added value of the first image shake amount and the second shake correction amount.

11. The control device according to claim 1,
wherein the first vibration detector is capable of detecting an angular velocity.

12. The control device according to claim 2,
wherein the first vibration detector is capable of detecting an angular velocity.

13. The control device according to claim 1,
wherein the processor is configured to derive the offset component based on a value obtained by subtracting an added value of the first shake correction amount and the third shake correction amount from an added value of the first image shake amount and the second shake correction amount.

14. A control device of an imaging apparatus including a first vibration detector and an imaging element, the control device comprising:
a processor,
wherein the processor is configured to:
derive a first shake correction amount corresponding to a shake caused by a vibration and a second shake correction amount different from the first shake correction amount, based on first output data output from the first vibration detector;
derive a first image shake amount related to a shake of an image based on image data obtained by imaging by the imaging element; and
derive an offset component included in the first output data, based on the first shake correction amount, the second shake correction amount, and the first image shake amount,
wherein the processor is configured to derive a shake amount among a plurality of pieces of the image data as the first image shake amount, and in a case where image data that does not satisfy a predetermined condition is included in the plurality of pieces of the image data, derive the first image shake amount based on image data except the image data that does not satisfy the predetermined condition.

15. A control device of an imaging apparatus including a first vibration detector and an imaging element, the control device comprising:
a processor,
wherein the processor is configured to:
derive a first shake correction amount corresponding to a shake caused by a vibration and a second shake correction amount different from the first shake correction amount, based on first output data output from the first vibration detector;
derive a first image shake amount related to a shake of an image based on image data obtained by imaging by the imaging element; and
derive an offset component included in the first output data, based on the first shake correction amount, the second shake correction amount, and the first image shake amount,
wherein the processor is configured to set a shutter speed of the imaging element set in a case of deriving the offset component to be higher than a shutter speed set in a case of not deriving the offset component.

16. A control device of an imaging apparatus including a first vibration detector and an imaging element, the control device comprising:
a processor,
wherein the processor is configured to:
derive a first shake correction amount corresponding to a shake caused by a vibration and a second shake correction amount different from the first shake correction amount, based on first output data output from the first vibration detector;
derive a first image shake amount related to a shake of an image based on image data obtained by imaging by the imaging element; and
derive an offset component included in the first output data, based on the first shake correction amount, the second shake correction amount, and the first image shake amount,
wherein the processor is configured to:
acquire first synchronization data related to synchronization between an imaging timing of the imaging element and an output timing of the first output data;
decide a combination of the image data and the first output data in synchronization based on the first synchronization data; and
derive the offset component based on the first shake correction amount, the second shake correction amount and the first image shake amount obtained from data of the decided combination.

17. An imaging apparatus comprising:
the control device according to claim 1.

18. A control method of an imaging apparatus including a first vibration detector and an imaging element, the control method comprising:
deriving a first shake correction amount corresponding to a shake caused by a vibration and a second shake correction amount different from the first shake correction amount, based on first output data output from the first vibration detector;

deriving a first image shake amount related to a shake of an image based on image data obtained by imaging by the imaging element; and deriving an offset component included in the first output data based on the first shake correction amount, the second shake correction amount, and the first image shake amount, wherein the first vibration detector is capable of detecting an angular velocity, the imaging apparatus further includes a second vibration detector capable of detecting acceleration, the second vibration detector is capable of detecting a movement of the imaging apparatus in a direction along a light-receiving surface of the imaging element, and the control method further comprises:

deriving a first movement amount of the imaging apparatus based on second output data output from the second vibration detector; and deriving the offset component based on the first shake correction amount, the second shake correction amount, the first image shake amount, and a third shake correction amount necessary for correcting a shake caused by the first movement amount.

19. A non-transitory computer readable medium storing a control program of an imaging apparatus including a first vibration detector and an imaging element, the control program causing a processor to execute:

deriving a first shake correction amount corresponding to a shake caused by a vibration and a second shake correction amount different from the first shake correction amount, based on first output data output from the first vibration detector;

deriving a first image shake amount related to a shake of an image based on image data obtained by imaging by the imaging element; and deriving an offset component included in the first output data based on the first shake correction amount, the second shake correction amount, and the first image shake amount, wherein the first vibration detector is capable of detecting an angular velocity, the imaging apparatus further includes a second vibration detector capable of detecting acceleration, the second vibration detector is capable of detecting a movement of the imaging apparatus in a direction along a light-receiving surface of the imaging element, and the control program further causes the processor to execute:

deriving a first movement amount of the imaging apparatus based on second output data output from the second vibration detector; and deriving the offset component based on the first shake correction amount, the second shake correction amount, the first image shake amount, and a third shake correction amount necessary for correcting a shake caused by the first movement amount.

\* \* \* \* \*